Aug. 23, 1927.

C. BROWN

BAKER'S OVEN

Filed Aug. 31, 1926

INVENTOR
C. Brown

Aug. 23, 1927.
C. BROWN
BAKER'S OVEN
Filed Aug. 31, 1926
1,640,333
3 Sheets-Sheet 2
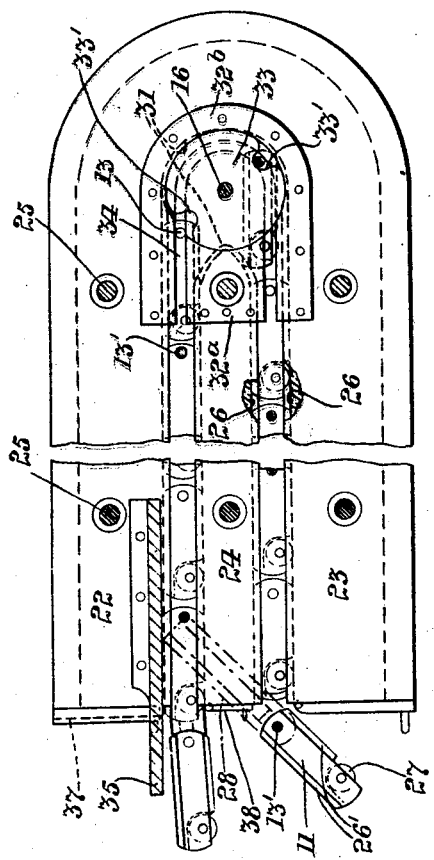
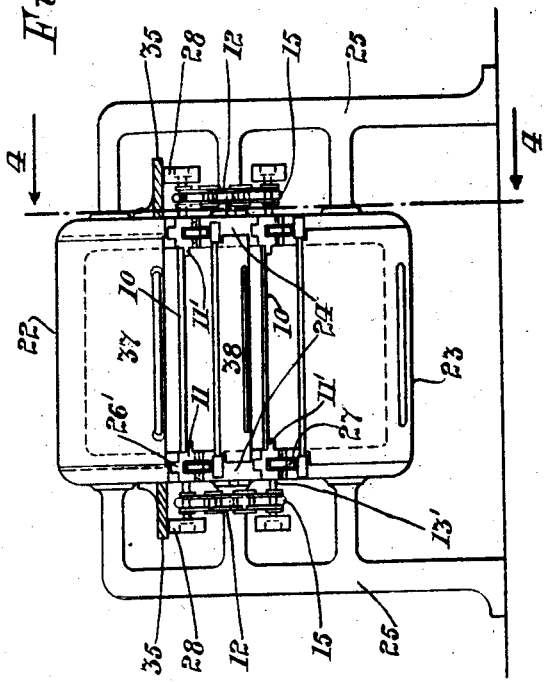
INVENTOR
C. BROWN,
BY ATTY.

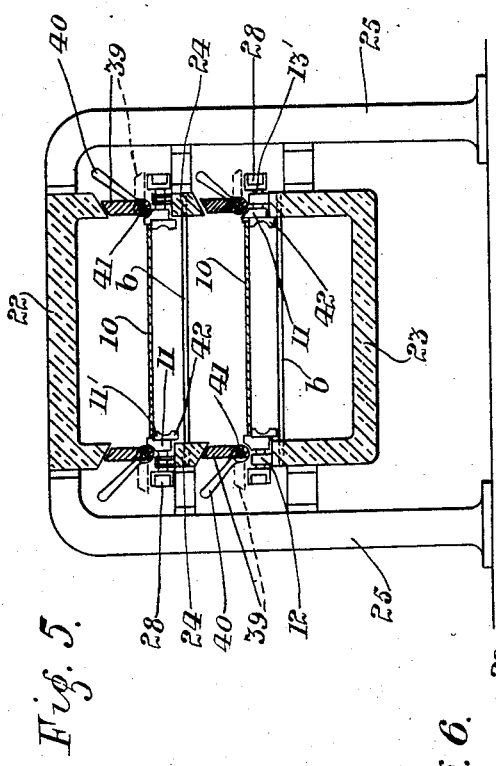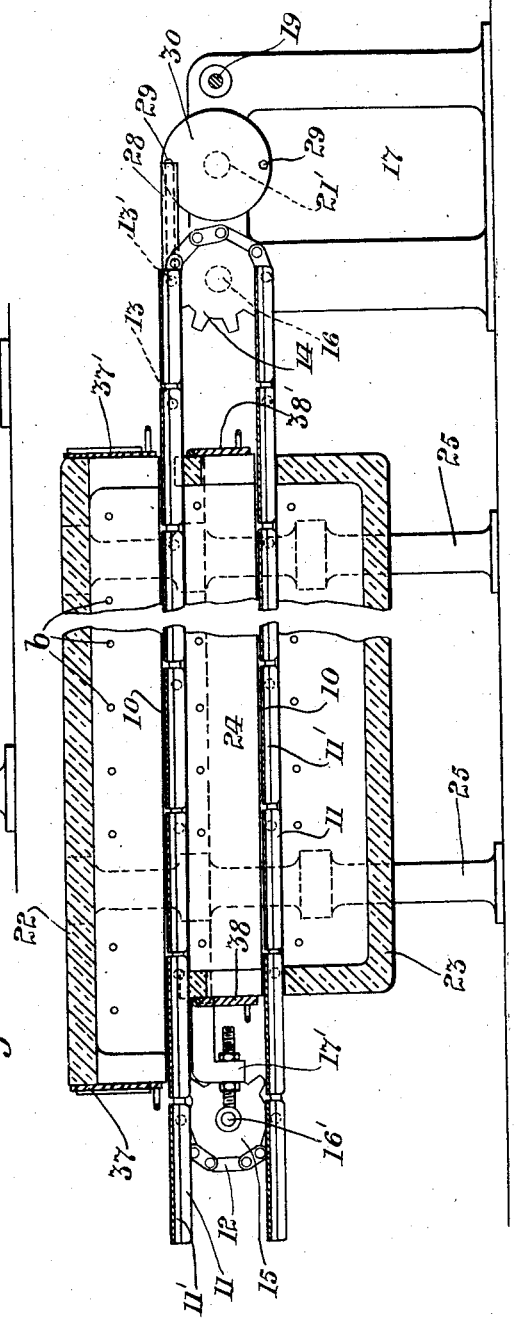

Patented Aug. 23, 1927.

1,640,333

UNITED STATES PATENT OFFICE.

CAMPBELL BROWN, OF BELFAST, IRELAND.

BAKER'S OVEN.

Application filed August 31, 1926, Serial No. 132,810, and in Great Britain August 4, 1925.

This invention relates to bakers' ovens of the kind in which there is arranged an endless chain of carrying members, such as plates, trays or shelves and constituting a conveyer for articles intended to be cooked or heated, the said carrying members being continuously movable by driving means, such as endless chains or belts, and having means by which they are normally maintained horizontal with the same side always uppermost.

The object of the invention is to provide in an oven of the kind referred to a conveyer which will be driven by means located externally of the heated zone of the oven, and means by which the apparatus can be converted for use as a travelling hot plate.

The invention is exemplified in the combination and arrangement of parts shown in the accompanying drawings and described in the following specification, and it is more particularly pointed out in the appended claims.

In the drawings:—

Fig. 3 is a section substantially on the line 3—3 of Fig. 1;

Fig. 4 is a section on the line 4—4 of Fig. 3;

Fig. 5 is a transverse section of a modification;

Fig. 6 is a longitudinal section of a further modification.

Similar reference characters denote similar or corresponding parts throughout the several views.

Figure 1:
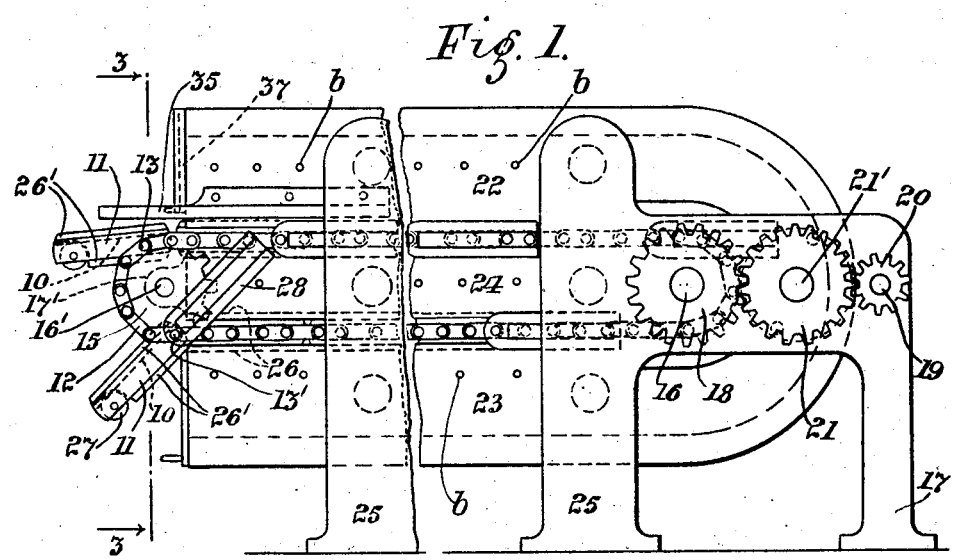
Fig. 1 is an elevation of a baker's oven equipped with a conveyer, constructed according to the invention.
Figure 2:
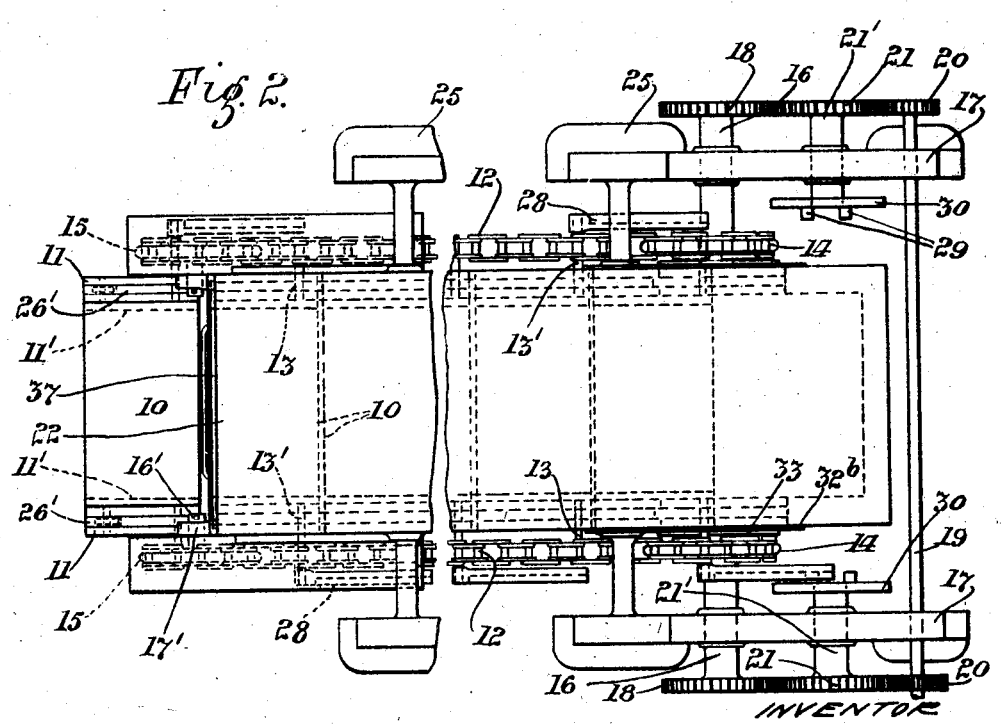
Fig. 2 is a corresponding plan.

Referring to Figs. 1–4, the conveyer therein shown comprises an endless chain of carrying members or plates 10, each of which is secured at its sides to a pair of opposed blocks 11, constituting units of two series of blocks adapted to slide along guideways in the side walls of the oven. Each block 11 is connected to one of a pair of driving chains 12, arranged along the sides of the oven externally thereof, by means of a spindle 13 and 13' which is rigidly secured to its block 11 near one end thereof, but is pivotally mounted in the relative chain 12.

Each of the driving chains 12 wraps two sprocket wheels 14, 15. The driving sprocket wheels 14 are carried by shafts 16 journalled in bearing brackets 17, and the sprocket wheels 15 are carried by shafts 16' journalled in bearing brackets 17' which are fixed on the walls of the oven. The shafts 16 are secured to gear wheels 18, which are driven in unison by a rotary shaft 19 also journalled in the brackets 17 and carrying gear wheels 20, which mesh with gear wheels 21 meshing, in turn, with the gear wheels 18.

The shaft 19 may be driven from any suitable source of power, such as an electric motor.

The walls of the oven are constituted by a casing consisting of an upper arched portion 22 and a lower inverted arched portion 23 and a pair of side walls 24 interposed between the sides of the casing 22, 23. Brackets 25 disposed on each side of the oven serve to support the casing 22, 23, and the walls 24, which are suitably spaced from the casing 22, 23 to provide the guideways along which the blocks 11 move. The upper and lower faces of the guideways are formed with grooves 26 which are engaged by conformably shaped feathers 26' on the blocks 11 in order to constrain the blocks to the guideways. A roller 27 is journalled in each block 11 and rides along the grooves 26 in the lower faces of the guideways, each roller 27 serving to support the end of the relative block 11 remote from that supported by the relative spindle 13 or 13'.

The blocks 11 are provided with ledges 11' to which the plates 10 are secured.

Known means are provided for maintaining the plates 10 horizontal, with the same side uppermost, whilst passing from one flight of the conveyer to the other, and also for causing the plates to tilt when they are clear of the oven in order to discharge the articles which they are carrying. The form which such means takes in the example illustrated will now be described.

Alternate spindles 13' are extended beyond the chains 12 and are rigidly fixed to grooved lever arms 28, each plate 10 being connected to one such extended spindle 13' and lever arm 28. In passing with the chains 12 from the upper to the lower flight, the groove in an arm 28 is entered by either of two pins 29 on one or other of two similar rotary discs 30 rigid with the shafts 21' of the gear wheels 21. The gear wheels 18 and 21 are of equal diameters and the pins 29 are disposed at such a radius that they will remain in the same horizontal plane as the spindles 13' while the latter are moving around the driving sprocket wheels 14. With this arrangement, the lever arms 28, blocks 11 and plates 10 are maintained horizontal whilst the plates 10 are passing from the upper to the lower flight. In order to permit the blocks to be maintained horizontal in this manner, the upper and lower guideways are considerably widened where they merge semi-circularly into one another, as shown at 31. The openings, which otherwise would be left in the sides of the oven between the walls 24 and the casing 22, 23 owing to such widening, are closed by means of stationary cover plates $32^a$, $32^b$, (see Fig. 4) arranged in pairs on the oven sides, and notched discs 33. The plates $32^a$ are secured to the walls 24 and the plates $32^b$, to the sides of the casing 22, 23. The plates $32^a$ and $32^b$ of each pair are spaced to provide for the spindles 13, 13' a passage 34 from the upper to the lower guideway. The discs 33, which bear against the outer sides of the plates $32^a$, $32^b$, are formed with peripheral notches 33' and are secured to the shafts 16 so that they rotate in unison with the driving sprocket wheels 14. The notches 33' are so disposed as to receive the spindles 13, 13' when the latter reach the periphery of the discs 33 and to move in unison with these spindles whilst they are moving around the semi-circular part of the passage 34, the notches thus affording the minimum openings in the walls of the oven for the passage of the spindles 13, 13' to the exterior thereof.

Secured to each side of the portion 22 of the casing above the upper guideway at its open end, is a stop 35 which extends in a horizontal plane vertically above the lever arms 28. As the plates 10 are carried in succession by the chains 12 clear of the oven, and the blocks 11 leave their guideways, each plate 10 is caused to tilt by gravity, until its lever arm 28 strikes the relative stop 35. Thereafter, the relative spindles 13, 13' are gradually carried upwards by the sprocket wheels 15 until the plate 10 and blocks 11 assume once more a substantially horizontal position, in which the blocks are guided into the upper guideways.

A sliding door 37 is provided on the portion 22 of the casing at the end thereof where the plates 10 enter the oven, and a hinged door 38 bridges the space between the walls 24 above the plates 10 where they emerge from the oven. By opening the door 37 or 38 articles of food on the plates 10 are permitted to enter or leave the oven.

The oven is heated by burners such as indicated at $b$.

It may be desired to convert the apparatus for use as a travelling hot plate. To this end, the portion 22 of the casing may be provided with doors immediately above the level of the upper flight of the conveyer and similar doors may be fitted to the walls 24. In the oven shown in Fig. 5, the portion 22 of the casing and the walls 24 are fitted with hinged doors 39 capable of being swung into open position (indicated in dotted lines) by means of handles 40 which are fixed on the ends of the door spindles 41 projecting from the oven at the charging and discharging end thereof. In this view the chains 12 are shown supported along with the blocks 11 in the guideways, the blocks each being formed with a shoulder 42, serving to constrain the blocks and plates to their correct position as they pass through the oven. The blocks 11 effectively shield the chains from the heat of the oven so that the latter are virtually located externally thereof.

It is not essential that the plates 10 should move from one flight to the other internally of the oven and it can be arranged that they move from one flight to the other externally thereof. This arrangement is illustrated in Fig. 6, in which the blocks 11 are shown passing out of the oven at both ends thereof. The means for maintaining the plates horizontal are located clear of the adjacent end of the oven which end is provided with a sliding door 37' and a hinged door 38' corresponding in construction and function with the doors 37 and 38, respectively. The discharge mechanism for the form of the invention shown in Fig. 6 is identical with that illustrated in Fig. 1, the illustration being omitted as it is not deemed necessary.

What I do claim as my invention and desire to secure by Letters Patent is:—

1. A baker's oven comprising a casing having slotted side walls constituting guideways, a series of blocks adapted to travel in said guideways, an endless chain of carrying members adapted to move in a circuitous path through the interior of the oven, said carrying members being fixed between the blocks in opposite side walls, driving means located outside of the oven, means for pivotally connecting said blocks to said driving means, and means co-acting with said pivotal connecting means for maintaining the said blocks and carrying members horizontal whilst passing from one level to another.

2. A baker's oven comprising a casing having slotted side walls constituting guideways, a series of blocks in said guideways, an endless chain of carrying members adapted to move in a circuitous path through the interior of the oven, said carrying members being fixed between the blocks in opposite side walls, driving means located outside of the oven, means for pivotally connecting said blocks to said driving means, said carrying means being permitted to assume an inclined position at one end of the oven, and means to limit this inclined position of the carrying members, said means serving to restore the carrying members to horizontal position in their further movement.

3. In a bakers' oven comprising a casing, having an upper portion and a lower portion, and a pair of side walls disposed between the said portions in spaced relationship thereto, said portions and side walls being supported by brackets, an endless chain of carrying members adapted to move in a circuitous path through the interior of the oven, doors located in the sides of the oven upper portion and in said side walls; a series of blocks operating between said upper and lower oven portions and the side walls, said carrying members being fixed between opposite blocks in the side walls, doors in said casing where the carrying members enter and leave it, and means for driving the carrying members located outside of the oven.

4. In a baker's oven, carrying members adapted to move in a circuitous path through the interior of the oven, means arranged wholly exterior of the oven and operating longitudinally thereof and connected to the carrying members for causing said members to move throughout said circuitous path in the interior of the oven, and supporting members for the carrying means movable longitudinally of and guided in the side walls of the oven.

5. In a baker's oven, side walls having guideways therein, carrying members adapted to move in a circuitous path in the interior of the oven, blocks supporting said carrying members and cooperable with said guideways in the side walls of the oven for guiding the blocks and thereby the carrying members in movement, and endless chains arranged immediately beyond the oven and operating longitudinally thereof for connection with said blocks for moving the latter longitudinally of the oven in said guideways.

6. A baker's oven comprising a casing including slotted side walls formed to provide guideways, carrying members adapted for travel in a circuitous path in the oven, blocks co-operating with the guideways and connected to the carrying members to guide the latter in their movement through the oven, chains operating longitudinally of and immediately beyond the oven, each of said blocks being pivotally connected at one end to the chains, means arranged at one end of the oven for maintaining the carrying members in their horizontal position in movement from one portion of the circuitous path to another, the path of travel of the chains being extended beyond the opposite end of the oven to thereby move the blocks free of the guideways to permit said blocks and thereby the carrying members to be inclined to discharge the material on the carrying members, and means for thereafter restoring the carrying members to their horizontal positions.

7. A baker's oven having side walls formed to present guideways, a series of independent carrying members movable in a circuitous path in the oven, chains adapted for travel longitudinally of and immediately beyond the oven, blocks supporting the members and cooperating with the guideways for guiding the travel in the oven, and connections intermediate said blocks and said chains.

8. A baker's oven having side walls formed to present guideways, a series of independent carrying members movable in a circuitous path in the oven, chains adapted for travel longitudinally of and immediately beyond the oven, blocks supporting the members and cooperating with the guideways for guiding the travel in the oven, connections intermediate said blocks and said chains, and means operating wholly exterior of the oven for maintaining the carrying members in a substantially horizontal position during transition from one portion of the circuitous path to another.

9. In a baker's oven, side walls formed of upper and lower portions and an intermediate portion spaced from the upper and lower portions to provide guideways, carrying members movable in said guideways, the intermediate portion of the side walls terminating short of the upper and lower portions to provide an extended space for the movement of the parts in the travel of the carrying members from one guideway to the other, and means for maintaining this extended space covered while permitting movement of the carrying members from one guideway to the other.

10. In a baker's oven including side walls formed to provide longitudinal guideways, blocks movable in the guideways, carrying members connected to the blocks, endless chains operating beyond the oven, connections between the chains and blocks, the guideways being interrupted in part to thereby provide an enlarged terminal space to permit of the travel of the blocks from one guideway to the other, and means for covering the enlarged space, said means being movable with said connections.

11. In a baker's oven, including side walls formed to provide longitudinal guideways, blocks movable in the guideways, carrying members connected to the blocks, endless chains operating beyond the oven, connections between the chains and blocks, the guideways being interrupted in part to thereby provide an enlarged terminal space to permit of the travel of the blocks from one guideway to the other, stationary cover plates on the walls of the oven, and rotary cover plates closing said enlarged space and moving with said connections, said rotary plates cooperating with said stationary plates.

12. In a baker's oven, side walls having slots forming guideways, carrying members adapted to move in a circuitous path in the interior of the oven, blocks cooperating with the guideways, a roller carried by each block to engage the guideway, each carrying member being connected to opposing blocks operating in the respective guideways, endless chains operating longitudinally of and immediately beyond the oven, and means connecting said chains and said blocks, the connections between the chains and blocks being at the ends of the blocks remote from the rollers.

In testimony whereof I affix my signature.

CAMPBELL BROWN.